May 15, 1923.
J. W. LEGG
HIGH SPEED CAMERA
Filed Jan. 30, 1920
1,454,899
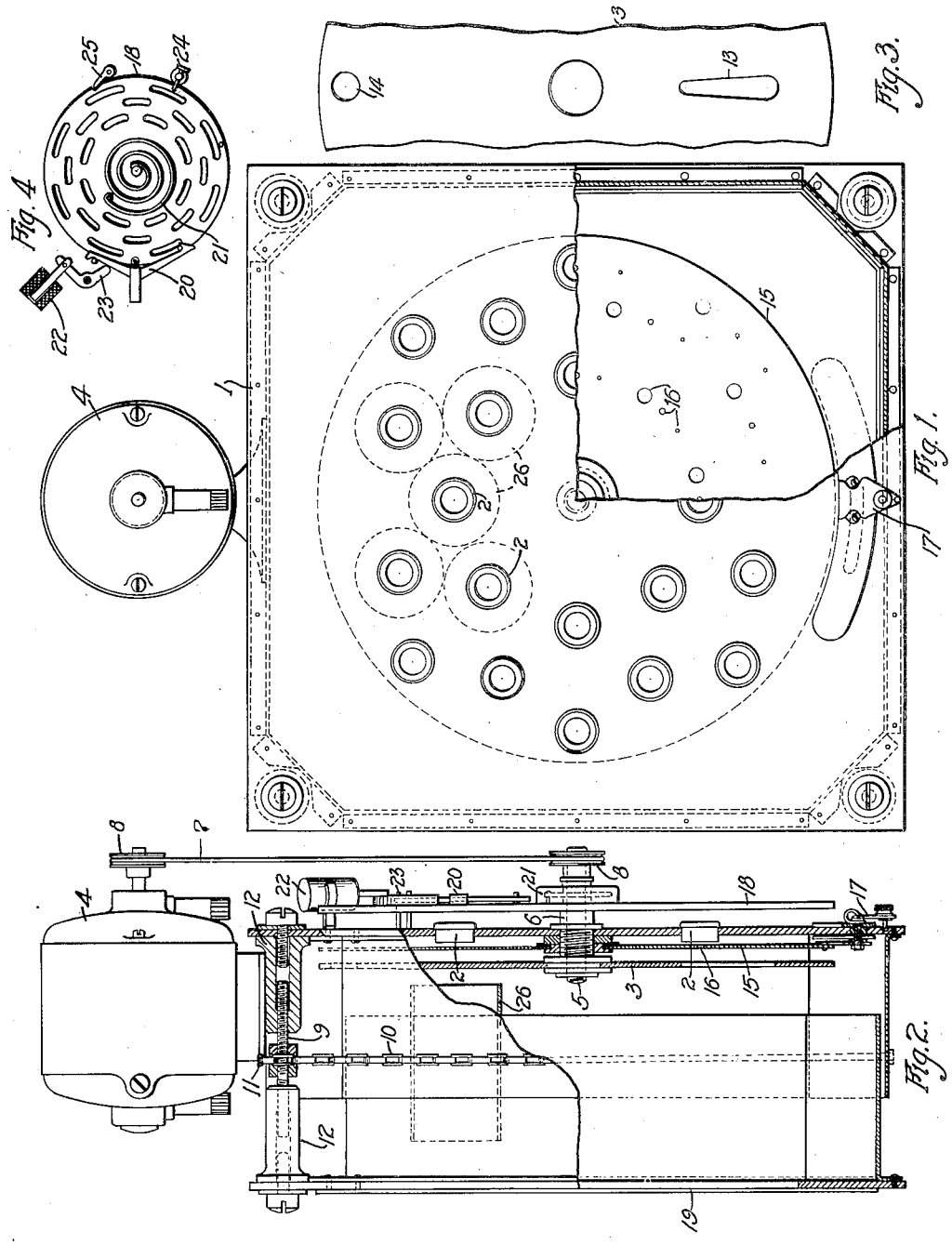
WITNESSES:
Geo. N. Barrett
J. E. Foster
INVENTOR
Joseph W. Legg.
BY
Wesley G. Carr
ATTORNEY Patented May 15, 1923.

1,454,899

UNITED STATES PATENT OFFICE.

JOSEPH W. LEGG, OF WILKINSBURG, PENNSYLVANIA, ASSIGNOR TO WESTINGHOUSE ELECTRIC & MANUFACTURING COMPANY, A CORPORATION OF PENNSYLVANIA.

HIGH-SPEED CAMERA.

Application filed January 30, 1920. Serial No. 355,256.

*To all whom it may concern:*

Be it known that I, JOSEPH W. LEGG, a citizen of the United States, and a resident of Wilkinsburg, in the county of Allegheny and State of Pennsylvania, have invented a new and useful Improvement in High-Speed Cameras, of which the following is a specification.

My invention relates to cameras and particularly to high-speed cameras of the polar multi-exposure type.

One object of my invention is to provide a device whereby an action or movement of short duration may be photographed in successive stages of its development.

Another object of my invention is to provide a device of the above indicated character for photographing an arc resulting from a short circuit or such similar condition.

Another object of my invention is to provide a device of the above indicated character that shall be simple and rugged in construction and reliable in its operation.

High-speed motion-picture cameras have been used for the study of moving pictures and in certain cases for the study of arc phenomena. In the usual forms of motion-picture cameras, about sixteen exposures a second are obtained. Special cameras have been in use in which several times this number of exposures may be obtained. However, to make a detailed study of electric-arc phenomena, this rate of exposure must be greatly increased. It is especially necessary for obtaining valuable data on the phenomena encountered in circuit-breaker arcs and commutator flashes. Since the light in arc photographs is so extremely intense, it is possible to use a simple and inexpensive lens to obtain an unusually good arc exposure.

For high-speed work it is desirable to replace either intermittent or reciprocating movements by simple rotary movements. I, therefore, provide a camera with a shutter movement that has simple rotary motion. All parts of the camera are stationary except the shutter, which is actuated by an electric motor. The shutter may also be actuated by a spring or by a hand-driven motor. The camera is provided with a plurality of lenses that are arranged, in staggered relation, in circles having the shutter shaft as a center. The shutter, which is a light-weight disk, has a radially-disposed slot therein, which is adapted to expose the lenses in sequence. The sides of the slot are so cut, along radii of the disk, as to give equal exposure to the lenses irrespective of the distance of the lens from the center of rotation. An opening in the shutter, adjacent to the periphery thereof and diametrically opposite the main slot, is adapted to expose, in sequence, a plurality of lenses that are so arranged in an outer circle as to permit simultaneous exposures with corresponding lenses in the staggered groups for stereoscopic views. A greater number of exposures may be obtained on the same plate by the staggered arrangement of the lenses, and a greater number of exposures per second may thus be obtained at the same shutter speed.

The particular arrangement of the shutter enables clear-cut exposures to be obtained. The width of the slot in the shutter is less than the circular arc between adjacent lenses and is greater than the lens iris. The actual time from the beginning of one exposure to the end of that exposure is much less than the time to the succeeding exposure.

For focusing the lenses, a sprocket-operated screw, having right hand threads on one end and left hand threads on the other end thereof, is provided at each corner of the camera. The screws are adapted to be threaded into socket members that are secured to the front and to the rear faces, respectively, of the camera. A chain, that surrounds the camera, operatively engages the sprockets to so actuate the screws as to adjust the front section of the camera to thus focus the lenses. A second disk or iris diaphragm, is provided with openings of several different sizes, and the disk may be so turned that the desired openings of any one size may be placed opposite the corresponding lenses, simultaneously. For photographing recurrent arcing, such as occurs in arc welding or in persistent flashing, it becomes necessary to use a limiting shutter that will preclude any exposures after the high-speed shutter has rotated one time. While the high-speed shutter rotates once at a strictly uniform speed, the slots of the limiting shutter pass the lenses at an accelerated speed and come to a stop after turning one eighth of the distance to prevent a second exposure of the lenses. The limiting shutter is driven by a spiral spring which may be wound up in accordance with the interval of time required for the exposure. The shutter is restrained by an escapement device that is actuated to release it at the beginning of the period of exposure.

Fig. 1 of the accompanying drawings is a front view, partially in elevation and partially in section, of a camera embodying my invention; Fig. 2 is a side view, partially in section and partially in elevation, of the camera shown in Fig. 1; Fig. 3 is a fragmentary plan view of the shutter, showing the arrangement of the slot and the opening therein; and Fig. 4 is a front elevational view of the limiting shutter and its controlling devices.

A high-speed camera 1 is provided with a plurality of lenses 2, a shutter 3 and a motor 4 for actuating the shutter. The shutter is mounted on the inner end of a shaft 5 that is supported in a bearing 6 and is actuated by the motor 4 through a belt 7 and pulleys 8. For adjusting the focus of the lenses, a plurality of screw members 9, having right and left hand screw threads on the opposite ends thereof, are adapted to be so simultaneously actuated by a chain 10 and sprockets 11 as to be advanced into, or withdrawn from, a plurality of internally screw-threaded socket members 12 that are secured to the front and the rear faces of the camera. The lenses are arranged in staggered relation in circles that are concentric with the shaft 5. A plurality of lenses are mounted in a circle that is also concentric with the shaft 5 and these serve as stereoscopic mates for corresponding lenses in the inner circles. The shutter 3 has a slot 13 and an opening 14 that are disposed diametrically opposite each other. These two openings are adapted to simultaneously expose corresponding lenses for stereoscopic views. A disk 15, that has a plurality of apertures 16 for each lens, is adjustably mounted on the bearing 6 and is adjusted by a knob 17. A limiting shutter 18 is provided to preclude an exposure of a plate 19 after the shutter 3 has rotated once. The limiting shutter 18 is normally held in position by an escapement device 20 and is actuated by a spring 21 when released. A tripping magnet 22 is adapted to so actuate the escapement device 20, through a bell crank 23, as to permit the release of the limiting shutter 18. A pin 24 so stops the limiting shutter 18 as to cover the lenses 2, and a pawl 25 so engages a notch in the edge of the shutter as to prevent the bouncing back thereof when it is suddenly stopped by the pin 24. A plurality of baffles 26 are mounted directly behind their corresponding lenses to prevent overlapping of adjacent pictures on the plate or film 19.

By means of the screw-and-socket members 9 and 12, the lenses of the camera may be adjusted to their correct focus. The disk 15 is then so adjusted that the correct apertures may be disposed between the lenses 2 and the plate 19. The motor 4 actuates the shutter 3 which exposes, in sequence, the various lenses through the slot 13 and through the stereoscopic opening 14. The staggered arrangement of the lenses permits the use of more lenses, and, therefore, more exposures may be made within the interval of time required for the action that is to be photographed. By means of the additional lenses in the outer circle, stereoscopic views may be obtained through the simultaneous exposure of corresponding lenses in the inner circles. The stereoscopic views increase the value of photographs of electric arcs since they show plainly the action thereof in three dimensions. For transient arc phenomena, such as the magnetic blowout of an electric arc, or other actions, it is only necessary to drive the polar shutter 3 at such speed that the interval of time required for one rotation will be slightly greater than that required for extinguishing the arc or completing the action to be photographed. The spring 21 on the limiting shutter is so energized as to turn the shutter through slightly less than one eighth of a rotation at an accelerated speed while the shutter 3 rotates once at constant speed. The shutter need be turned through only slightly less than one eighth of a rotation since the adjacent lenses in the inner circles are angularly spaced one eighth of a rotation apart.

In the camera that is shown, sixteen exposures may be obtained through one rotation of the shutter 3. At a speed of 7500 R. P. M. the rate of exposure is $\frac{(7500)}{60} \times 16$ or 2,000 exposures per second.

Although I have shown and described a camera embodying only one combination of specific elements, I do not limit my invention to the structure shown, as various modifications may be made therein within the spirit and scope of the invention as set forth in the appended claims.

I claim as my invention:

1. In a camera, the combination with a plurality of lenses, of means for permitting a plurality of exposures through the lenses in sequence and a limiting shutter for precluding a second exposure through the lenses.

2. In a camera, the combination with a plurality of lenses, of means for permitting a plurality of exposures through the lenses in sequence, a limiting shutter for precluding a second exposure through the lenses, and means for actuating the shutter.

3. In a camera, the combination with a plurality of lenses, of means having a constant speed for permitting successive exposures of a sensitized member through the lenses, means for precluding a second exposure therethrough and means for actuating said precluding means.

4. In a camera, the combination with a plurality of lenses having supporting means therefor, of means for adjusting the relative positions of lenses with respect to a sensitized member, means for permitting successive exposures of the sensitized member through the lenses, means for precluding the overlapping of the exposures on the sensitized member, means for actuating the exposing means, a diaphragm having a plurality of openings of different sizes for the lenses, means for adjusting the openings simultaneously, means for precluding a second exposure of the sensitized member and means for actuating the precluding means.

5. In a camera, the combination with a plurality of lenses, of means for permitting successive exposures of a sensitized member through the lenses, means for precluding a second exposure of the sensitized member, and means for actuating the precluding means.

6. In a camera, the combination with a plurality of main lenses arranged in two concentric circles and respectively staggered, and a plurality of secondary lenses so arranged in a third circle that the respective lenses are diametrically opposite predetermined main lenses of the first circles, of a shutter disposed between the lenses and a sensitized member to permit successive exposures of the sensitized member through the main lenses for direct views and through predetermined main lenses and the secondary lenses for stereoscopic views.

7. A polar, multi-exposure, high-speed camera comprising a plurality of lenses arranged in concentric circles and a disc shutter embodying a radial slot for permitting successive exposure of predetermined lenses and an aperture for co-operating with the radial slot to expose other predetermined lenses for stereoscopic exposures.

8. A camera comprising a plurality of lenses arranged in concentric circles and a shutter for permitting successive exposures of a sensitized member through predetermined lenses and for simultaneously permitting the exposure of the sensitized member through other predetermined lenses to obtain stereoscopic exposures.

9. A polar, multi-exposure, high-speed camera comprising a plurality of lenses arranged in concentric circles to permit simultaneous exposure of symmetrically disposed lenses as desired and a diaphragm embodying a plurality of openings of different sizes for each lens whereby adjustment may be simultaneously made for all of the lenses.

10. A polar, multi-exposure, high-speed camera comprising a plurality of lenses arranged in concentric circles, to permit simultaneous exposure of predetermined symmetrically disposed lenses, a diaphragm embodying a plurality of openings of different sizes for each lens and means for adjusting the diaphragm to place the desired opening adjacent the lenses.

11. A camera embodying a plurality of lenses and a shutter for permitting successive exposures through predetermined lenses and for permitting simultaneous exposures through other predetermined lenses to obtain stereoscopic exposure, said shutter comprising a disc member having a radial slot and an aperture therein disposed in diametrically opposite positions.

In testimony whereof, I have hereunto subscribed my name this 6th day of January, 1920.

JOSEPH W. LEGG.